(12) United States Patent
Kao

(10) Patent No.: US 8,395,635 B2
(45) Date of Patent: Mar. 12, 2013

(54) METHOD FOR STORING INTERPOLATION DATA

(75) Inventor: Jung-Yang Kao, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 1336 days.

(21) Appl. No.: 11/562,419

(22) Filed: Nov. 22, 2006

(65) Prior Publication Data

US 2008/0069220 A1    Mar. 20, 2008

(30) Foreign Application Priority Data

Sep. 19, 2006  (TW) .............................. 95134555 A

(51) Int. Cl.
*G09G 5/36* (2006.01)
*G06F 12/00* (2006.01)

(52) U.S. Cl. ........................................ 345/557; 345/568
(58) Field of Classification Search .................. 345/557, 345/568

See application file for complete search history.

(56) References Cited

U.S. PATENT DOCUMENTS

| | | | | |
|---|---|---|---|---|
| 5,644,677 | A * | 7/1997 | Park et al. ....................... | 704/207 |
| 6,658,056 | B1 * | 12/2003 | Duruoz et al. ................. | 375/240 |
| 2004/0057517 | A1 * | 3/2004 | Wells ........................ | 375/240.16 |
| 2005/0013496 | A1 * | 1/2005 | Bruls et al. .................... | 382/239 |
| 2005/0286777 | A1 * | 12/2005 | Kumar et al. .................. | 382/232 |
| 2006/0050976 | A1 * | 3/2006 | Molloy .......................... | 382/233 |
| 2007/0064006 | A1 * | 3/2007 | Saxena ........................... | 345/557 |

OTHER PUBLICATIONS

Kao, Jung-Yang; Method for Decreasing Computation Load and Memory Access Frequency during Interpolation for Video Coding; Signal 2007 IEEE Workshop on Processing Systems; Nov. 21, 2007; pp. 610-614.*

Asaduzzaman, A. and Mahgoub, I.; Cache Optimization for Embedded Systems Running H.264/AVC Video Decoder, Apr. 18, 2006; IEEE International Conference on Computer Systems and Applications, 2006; pp. 665-672.*

Shin-Haeng Ji, Jung-Wook Park, and Shin-Dug Kim; Optimization of Memory Management for H.264/AVC Decoder; The 8th International Conference Advanced Communication Technology, 2006. ICACT 2006; May 8, 2006, pp. 65-68.*

* cited by examiner

*Primary Examiner* — Jeffery A Brier
(74) *Attorney, Agent, or Firm* — Jianq Chyun IP Office

(57) ABSTRACT

A method for storing interpolation data is provided. The method uses a buffer in a cache memory and the concept of memory overlap record for storing previously calculated interpolation data, so as to avoid repeated interpolation, thereby decreasing the amount of system operation and the frequency of reading integer points for calculating interpolation from an external memory. Furthermore, a method of data storage for the buffer is provided. The storage method uses the concept of memory address rotation to store interpolation data beyond the boundary of the buffer. Moreover, another storage method is provided, which distributes interpolation data into a plurality of regions in the buffer according to different combinations of decimal coordinates of the interpolation points for economizing the use of memory space and simplifying the search of interpolation data in the buffer.

8 Claims, 3 Drawing Sheets

METHOD FOR STORING INTERPOLATION DATA

CROSS-REFERENCE TO RELATED APPLICATION

This application claims the priority benefit of Taiwan application serial no. 95134555, filed Sep. 19, 2006. All disclosure of the Taiwan application is incorporated herein by reference.

BACKGROUND OF THE INVENTION

1. Field of Invention

The present invention relates to interpolation in a video encoding and decoding system. More particularly, the present invention relates to a method for storing interpolation data in a video encoding and decoding system.

2. Description of Related Art

In the current video encoding and decoding system, the motion estimation has precisions of ½, ¼, ⅛ points, wherein these non-integer points do not exist in an external memory and are obtained through the calculation of integer points in the external memory. Therefore, in the video encoding and decoding system, interpolation is adopted no matter for motion estimation or motion compensation, as long as the motion vector of non-integer points is concerned.

For example, referring to FIG. 1, in the H.264 video system specification, the pixel value at the ½ point is calculated by a six-tap finite impulse response (FIR). In FIG. 1, white blocks (such as A, B, C, D) represent the positions of integer points, and lined blocks (such as aa, bb, h, m) represent the positions of ½ points that need interpolation. The pixel value at b point is the integer value of the formula (E−5F+20G+20H−5I+J)/32. The pixel value at h point is the integer value of the formula (A−5C+20G+20M−5R+T)/32. Seen from the above formulae, the pixel value at ½ point is calculated through four multiply operations. As for the recently most popular image format, i.e., the common intermediate format (CIF), each frame has 352×288 pixels, such that (703×575−352×288(integer points))×4=1,211,396 multiply operations, approximately 1.2 million multiply operations, are needed to calculate all pixel values at ½ points of the CIF, and approximately 50 million multiply operations are needed to calculate all pixel values at ⅛ points. In addition, the pixel values at ¼ points can be calculated by an adder and a shifter, and thus are not discussed here. Moreover, in the CIF, the ½ points altogether have 703×575−352×288(integer points)=302,846 pixels, which represents that approximately 296 Kbytes memory space is required for storing all of the pixel values at ½ points, and about 6 Mbytes memory space is required for storing all of the pixel values at ⅛ points. As the interpolation points are deduced from the integer points stored in the external memory, if the bandwidth of the external memory is assumed to be 16 bits, to calculate the pixel values at ½, ¼ and ⅛ points, the integer point data of the whole frame has to be captured in each category, i.e., to capture 396×256×1.5/16=76032 times.

In view of the above, in video encoding and decoding systems, it is desirable to reduce the amount of operation for calculating the interpolation points and the memory space required for storing the interpolation points. It is also desirable to reduce the frequency of reading integer points data from the external memory.

SUMMARY OF THE INVENTION

The present invention is directed to providing a method for storing interpolation data, which uses a buffer in a cache memory to store the previously calculated interpolation data, so as to reduce the amount of operation and the access frequency of the memory.

The present invention is further directed to providing a method for storing interpolation data, which employs a storage manner that can effectively utilize the memory space to avoid wasting of the above buffer space.

In a preferred embodiment of the present invention, as strongly related images are overlapped in many parts, a buffer is used to store the previously calculated interpolation points, thereby avoiding repeated interpolation and decreasing the amount of calculation and the frequency of reading the pixels at integer points from an external memory.

Another preferred embodiment of the present invention provides a storage method for the buffer in the cache memory. Based on the decimal parts of the logical coordinates of interpolation points corresponding to the external memory, the buffer is divided into a plurality of regions for storing the interpolation data of non-integer points. Therefore, the search of interpolation data in the buffer may be achieved rapidly without reserving the positions of integer points, the use of memory space is economized, and the efficiency thereof is improved.

In order to make the aforementioned and other objectives, features and advantages of the present invention comprehensible, preferred embodiments accompanied with figures are described in detail below.

DESCRIPTION OF EMBODIMENTS

In the following preferred embodiment, a video encoder or video decoder is used for example. The video encoder or video decoder of this embodiment adopts an external memory to store the pixel data of integer points of the reference frame, and employs a built-in cache memory as a buffer to store the previously calculated pixel values of the non-integer points.

To reduce the amount of system operation and the access frequency of the external memory, a cache memory of large capacity can be used to store the previously calculated interpolation data. However, an over-sized cache memory may cause problems in the circuit area and price. Therefore, a buffer of a relatively smaller size, for example, 32×32 pixels, is employed in this embodiment, and the concept of memory address rotation (the details thereof will be illustrated later) is also adopted, such that the amount of system operation and the access frequency of the external memory can be effectively decreased without using a cache memory of excessively large capacity. In this embodiment, every time the interpolation data of a non-integer point is required, whether the required interpolation data of a non-integer point is stored in the buffer is first determined, if yes, the data is fetched directly without repeated interpolation; while if not, the data of integer points adjacent to the above non-integer point is read from an external memory for calculating the required interpolation data, and the calculated interpolation data is stored into the buffer for repeated use.

Figure 1:
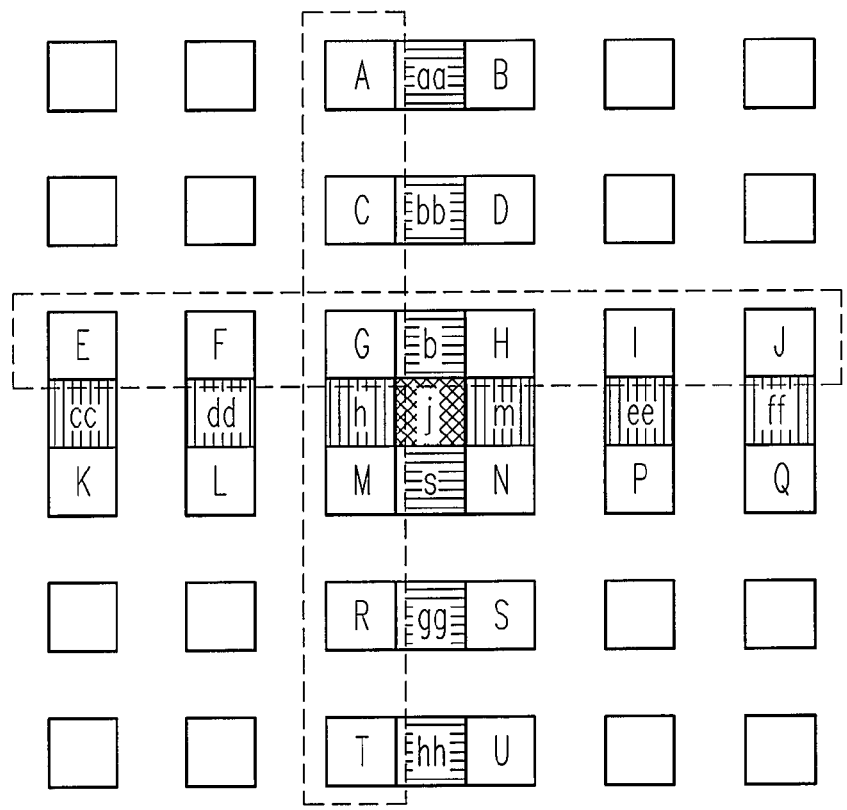
FIG. 1 is a schematic view of interpolation in a common video encoding and decoding system.
Figure 2:
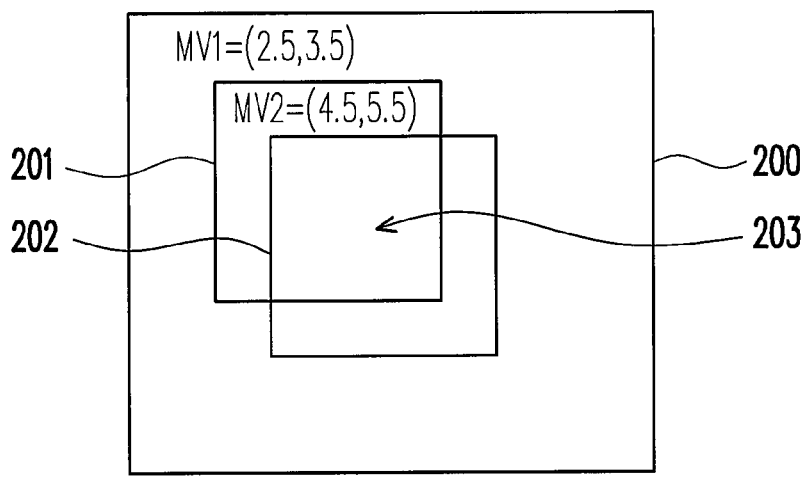
FIG. 2 is a schematic view of a buffer for interpolation data according to an embodiment of the present invention.

FIG. 2 is an example of the above method. Referring to FIG. 2, a buffer for storing interpolation data is marked with 200. Assume that a certain macroblock of the current frame is corresponding to a macroblock 201 of non-integer points in the reference frame according to a motion vector MV1, and is corresponding to a macroblock 202 of non-integer points in the reference frame according to a motion vector MV2. The interpolation data of the macroblock 201 has been stored in the buffer 200 when being calculated. When the interpolation data of the macroblock 202 is required, the interpolation data of the overlap section 203 of the above two macroblocks can be directly provided by the buffer 200 without repeated interpolation. As for the macroblock 202, 31×31×4=3844 multiply operations are needed initially, but only 31×4−16×2=368 multiply operations are required after the overlap section 203 is subtracted, thus saving about 90.4% of the amount of operation.

The size of the buffer in this embodiment is not limited to 32×32 pixels. Actually, in this embodiment, the size distribution of the MVD of at least one video bitstream is first counted, and the size of the buffer is determined according to the size distribution. The so-called size of the MVD is defined as the maximum value among the coordinate components of the MVD. For example, a certain MVD is (a, b), wherein if a is larger than b, then the size of the MVD is a, otherwise b.

In this embodiment, three video bitstreams, namely News, Silent and Football, respectively representing video images of low frequency, intermediate frequency and high frequency are analyzed. The video bitstream News is mainly news broadcast, wherein the image movement variation is small. The video bitstream Silent is mainly gesture language, wherein the image movement is concentrated in some areas and the movement variation is higher than News. The video bitstream Football is the scene of playing American football, wherein the movement variation of the players and the football is significant. The above three video bitstreams are all of the CIF specification, and the analysis results are shown in Table 1 as follows.

TABLE 1

| MVD Analysis Statistics of Various Video Bitstreams | | | |
|---|---|---|---|
| MVD < 8 pixels | 8 < MVD < 16 pixels | 16 < MVD < 32 pixels | MVD > 32 pixels |

| | MVD < 8 pixels | 8 < MVD < 16 pixels | 16 < MVD < 32 pixels | MVD > 32 pixels |
|---|---|---|---|---|
| News | 67% | 32.9% | 0.1% | 0% |
| Silent | 22% | 57% | 19% | 2% |
| Football | 11% | 36% | 45% | 8% |

In Table 1, most of the MVDs are smaller than 32 pixels, so the size of the buffer in this embodiment is set to be 32×32 pixels. To integrally process high frequency videos, a buffer of 64×64 pixels is employed; while to integrally process low frequency videos, a buffer of 16×16 pixels is enough. To sum up, the size of the buffer can be adjusted depending on the size distribution of the MVDs. For example, the minimum side length of the buffer may be set to be larger than each of the sizes of a predetermined proportion of all the MVDs of the video bitstreams.

Figure 3:
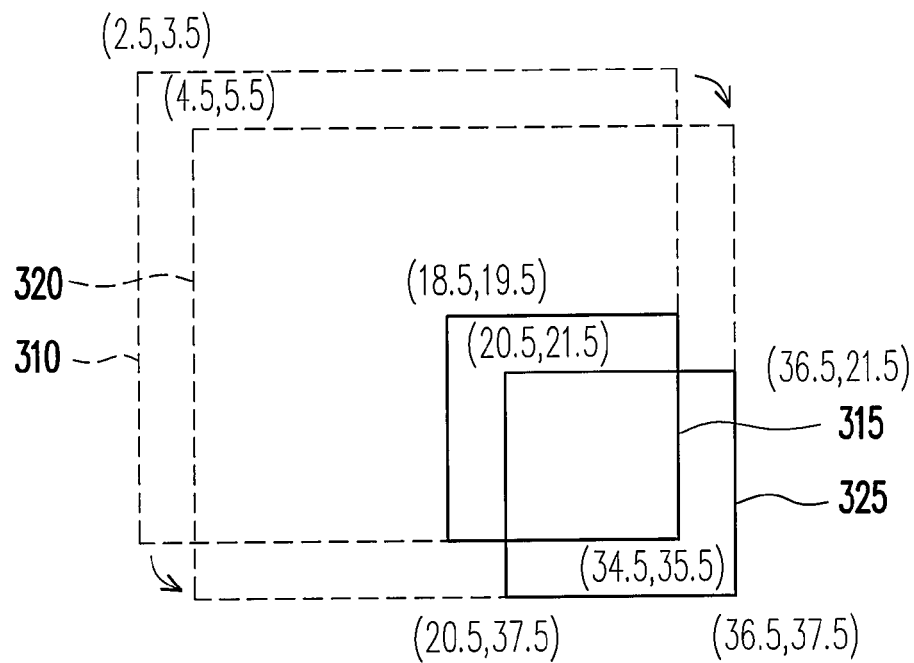
FIGS. 3 and 4 are schematic views of memory address rotation according to an embodiment of the present invention.

The buffer of this embodiment is a two dimensional array corresponding to a region of the same size in the reference frame. As the size of the buffer is limited, it is unavoidable that some macroblocks of non-integer points exceed the boundary of the buffer. Referring to FIG. 3, assume that the initial corresponding boundary of the buffer in the reference frame is 310, wherein the logical coordinates of the upper left corner of the buffer in the reference frame are (2.5, 3.5), the logical coordinates of the lower right corner thereof in the reference frame are (34.5, 35.5), and the upper left corner is taken as the starting point. The macroblock 315 is accommodated within the boundary 310, wherein the logical coordinates of the upper left corner of the macroblock 315 in the reference frame are (18.5, 19.5), and the logical coordinates of the lower right corner thereof in the reference frame are (34.5, 35.5). The logical coordinates of the non-integer points in the macroblock 315 are calculated according to a certain macroblock in the current frame and the motion vector thereof.

In FIG. 3, the logical coordinates of the upper left corner of another macroblock 325 are (20.5, 21.5), and the logical coordinates of the lower right corner thereof are (36.5, 37.5). As for the current boundary 310, to store the interpolation data of the macroblock 325, a portion of the non-integer points may exceed the range. In this embodiment, if a non-integer point exceeds the boundary of the buffer, the logical coordinates of the starting point of the buffer are adjusted to make the non-integer point fall within the new boundary of the buffer. In the example of FIG. 3, to accommodate the interpolation data of the macroblock 325, the logical coordinates of the starting point of the buffer are moved from (2.5, 3.5) to (4.5, 5.5), i.e., moving the boundary of the buffer from 310 to 320.

The access of the interpolation data in the buffer depends on its real coordinates which are different from the logical coordinates in the reference frame. Whenever the starting point of the buffer is moved, the logical coordinates and real coordinates of the starting point are moved synchronously, such that the interpolation data stored in the buffer does not have to be moved along with the starting point. The method for calculating the real coordinates of a non-integer point is that, for each logical coordinate of the non-integer point, the result of the logic coordinate minus the corresponding logical coordinate of the starting point plus the corresponding real coordinate of the starting point is calculated, and the result is taken as the real coordinate corresponding to the logic coordinate of the non-integer point. Each of the above logical coordinates refers to various sub-coordinates in different coordinate axes, and the corresponding relation between the above sub-coordinates is about the same coordinate axis. For example, in the example of FIG. 3, the logical coordinates of the starting point on the boundary 310 of the buffer are (2.5, 3.5), and the real coordinates of the starting point are [0] [0]. The x logical coordinate of the upper left corner of the macroblock 315 is 18.5, subtract the x logical coordinate 2.5 of the starting point from the above logical coordinate and then add the x real coordinate 0 of the starting point, the result is 16, which is the x real coordinate of the upper left corner of the macroblock 315. Similarly, the y logical coordinate of the upper left corner of the macroblock 315 is 19.5, subtract the y logical coordinate 3.5 of the starting point from the above logical coordinate and then add the y real coordinate 0 of the starting point, the result is 16, which is the y real coordinate of the upper left corner of the macroblock 315. When the boundary of the buffer is moved from 310 to 320, the new logical coordinates of the starting point are (4.5, 5.5), and the new real coordinates of the starting point are [2][2]. Subtract the logical coordinates (4.5, 5.5) of the starting point from the logical coordinates (18.5, 19.5) of the upper left corner of the macroblock 315 and then add the real coordinates [2][2] of the starting point, the result is the real coordinates [16][16] as well. Seen from the above, as the logical coordinates and real coordinates of the starting point are moved synchronously, the real coordinates of the same non-integer point before and after the movement of the boundary are identical. Therefore, the interpolation data of the non-integer point does not have to be moved in the buffer along with the starting point.

Figure 4:
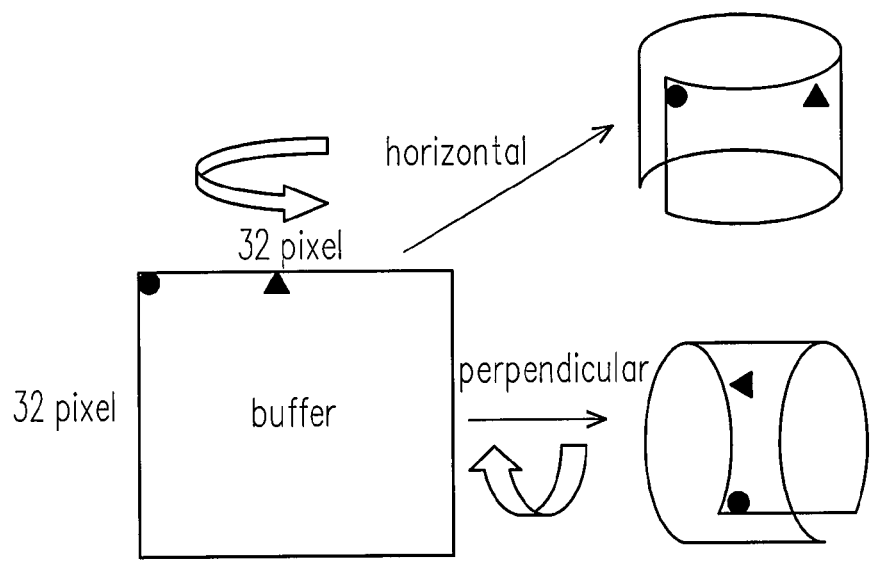

After the position of the starting point is moved, the real coordinates of the non-integer point may still exceed the boundary of the buffer. For example, in FIG. 3, the real coordinates of the lower right corner of the macroblock 325 are [34][34], which exceeds the maximum tolerable coordinates [31][31]. At this time, this embodiment resorts to the concept of memory address rotation. Referring to FIG. 4, the non-integer points with real coordinates exceeding the right side of the buffer are stored on the left side of the buffer, and the non-integer points with real coordinates exceeding the lower side of the buffer are stored on the upper side of the buffer, vice versa. More precisely, if a real coordinate of a non-integer point corresponding to a coordinate axis is smaller than the lower limit of the buffer corresponding to the same coordinate axis, the side length of the buffer corresponding to the same coordinate axis is added to the real coordinate. On the contrary, if a real coordinate of a non-integer point corresponding to a coordinate axis is larger than the upper limit of the buffer corresponding to the same coordinate axis, the side length of the buffer corresponding to the same coordinate axis is subtracted from the real coordinate. For example, the logical coordinates of the upper right corner of the macroblock 325 are (36.5, 21.5), and the real coordinates thereof are [34][18]. As the x real coordinate of the macroblock 325 exceeds the upper limit 31 of the buffer in the x axis, the side length 32 of the buffer in the x axis must be subtracted, and then the access in the buffer is performed according to the adjusted real coordinates [2][18]. Similarly, the logical coordinates of the lower left corner of the macroblock 325 are (20.5, 37.5), and the real coordinates thereof are [18][34]. As the y real coordinate of the macroblock 325 exceeds the upper limit 31 of the buffer in the y axis, the side length 32 of the buffer in the y axis must be subtracted, and then the access in the buffer is performed according to the adjusted real coordinates [18] [2].

Figure 5:
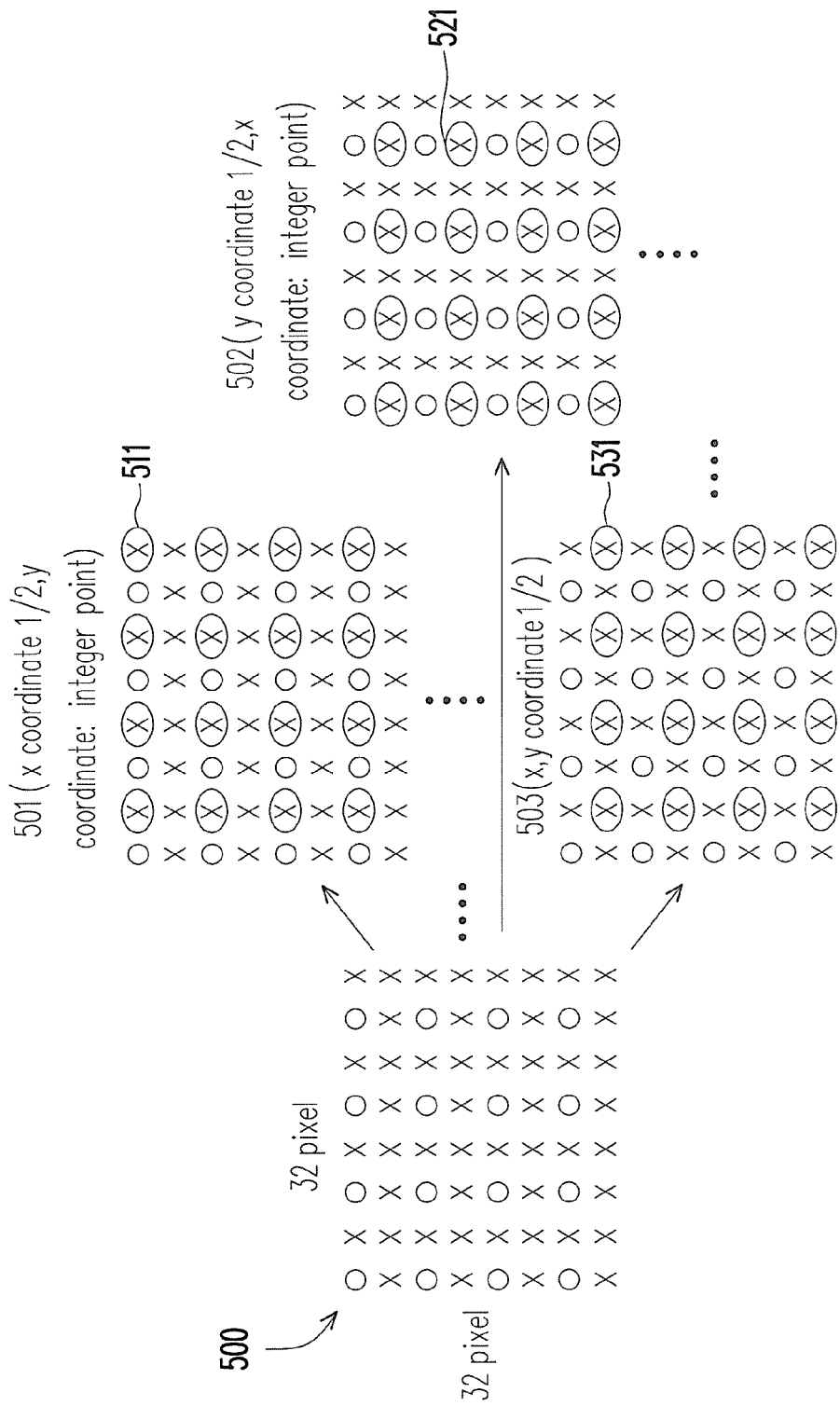
FIG. 5 is a schematic view of the storage method of distributing data into divided regions according to an embodiment of the present invention.

Referring to FIG. 5, in the buffer 500 of FIG. 5, besides the non-integer points (marked by x), the storage positions of the integer points (marked by o) are also reserved for simplifying the search of the interpolation data of the non-integer points in the buffer 500. However, as such, the memory space is wasted. On the contrary, if the positions of the integer points are not reserved for economizing the cache memory, a complicated addressing operation is needed to determine the storage positions of the non-integer points. Therefore, to save the memory space and meanwhile improve the operation efficiency, this embodiment adopts a method shown in FIG. 5, wherein the buffer is divided into a plurality of regions, and the interpolation data of the non-integer points are distributed into the regions. The region 501 stores the data of non-integer points with an x coordinate as ½ and y coordinate as an integer point, for example, 511. The region 502 stores the data of non-integer points with a y coordinate as ½ and x coordinate as an integer point, for example, 521. The region 503 stores the data of non-integer points with x, y coordinates both as ½, for example, 531. As such, the non-integer points in each region are arranged regularly, which not only facilitates the addressing of the non-integer points, but also avoids wasting memory space on the integer points.

In FIG. 5, the storage method of distributing data into divided regions takes ½ points as an example. Actually, the above method is also applicable to other non-integer points, for example, ¼ points or ⅛ points. The buffer of ¼ points should be divided into $4^2-1=15$ regions, the buffer of ⅛ points should be divided into $8^2-1=63$ regions, and the rest may be deduced by analogy. A general principle is that, in each region, the decimal part of the logical coordinate of each non-integer point in each coordinate axis is identical to that of the logical coordinate of another non-integer point in the same coordinate axis in the same region. For example, in the region 502 of FIG. 5, the decimal part of the x logical coordinate for each non-integer point is 0, and the decimal part of the y logical coordinate for each non-integer point is 0.5. Additionally, the collection formed by the decimal parts of the logical coordinates of the non-integer points in each region is different. For example, in the example of FIG. 5, the collection formed by the decimal parts of the logical coordinates of the non-integer points in the region 501 is {0.5, 0}, the region 502 is {0, 0.5} and the region 503 is {0.5, 0.5}, which are different from each other.

The experimental results of this embodiment are described below. The experimental environment of this embodiment is H.264 decoder, wherein the CIF video bitstreams News, Silent and Football, are tested respectively, the reference code JM8.2 of the International Standards Organization (ISO) is compared with the method of this embodiment, and the amount of multiply operation (the frequency of multiply operation) required for calculating the pixel values at ½ points and the capacity of the memory in each frame are evaluated. The experimental results are shown in Tables 2, 3 and 4. Seen from the following tables, compared with the conventional JM8.2, this embodiment can surely reduce the amount of multiply operation and the access frequency of the memory.

TABLE 2

Experimental Results of CIF Video Bitstream News

| News | JM8.2 | This Embodiment | Improvement Rate |
| --- | --- | --- | --- |
| Amount of Multiply Operation | 357,000/frame | 113,000/frame | 68% |
| Capacity of Memory | 148.5 Kbytes/frame | 49.5 Kbytes/frame | 66.7% |

TABLE 3

Experimental Results of CIF Video Bitstream Silent

| Silent | JM8.2 | This Embodiment | Improvement Rate |
| --- | --- | --- | --- |
| Amount of Multiply Operation | 206,000/frame | 86,000/frame | 58.5% |
| Capacity of Memory | 148.5 Kbytes/frame | 65.4 Kbytes/frame | 56% |

TABLE 4

Experimental Results of CIF Video Bitstream Football

| Football | JM8.2 | This Embodiment | Improvement Rate |
| --- | --- | --- | --- |
| Amount of Multiply Operation | 87,000/frame | 67,000/frame | 23% |
| Capacity of Memory | 148.5 Kbytes/frame | 117.4 Kbytes/frame | 21% |

In view of the above, this embodiment uses a relatively small buffer to store the previously calculated interpolation data, such that the amount of operation for the interpolation points and the frequency of reading the data of integer points from an external memory are reduced, and thus a moderately-sized cache memory is enough. This embodiment also adopts a storage method of distributing the data of non-integer points into divided regions, so as to maintain a simple addressing operation and avoid wasting the buffer space. The present invention is not limited to the video encoding and decoding system, but applicable to any calculation system that has to perform interpolation repeatedly. The data of integer points required for calculating interpolation points is not limited to be acquired from a reference frame, but can also be acquired from any two dimensional data arrays. As for the above calculation system, the data of the integer points can not only be stored in an external memory, but also in a common built-in memory.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A method for storing interpolated data of a plurality of non-integer points, implemented by a calculation system calculating the interpolated data of the plurality of non-integer points, comprising:

the calculation system determining whether the interpolated data of the plurality of non-integer points are stored in a buffer of the calculation system, wherein the calculation system is a video encoder or a video decoder, and the buffer is stored in a built-in cache memory of the calculation system;

if the interpolated data of the plurality of non-integer points are stored in the buffer, the calculation system providing the interpolated data;

if the interpolated data are not stored in the buffer, the calculation system reading the data of a plurality of integer points adjacent to the non-integer points from another memory of the calculation system, calculating the interpolated data of the plurality of non-integer points by interpolating the data of the integer points, and storing the interpolated data of the plurality of non-integer points into the buffer;

when the calculation system accesses the interpolated data of the non-integer points in the buffer, for each logical coordinate of the non-integer points, the calculation system calculating a result of the logical coordinate minus a corresponding logical coordinate of a starting point of the buffer plus a corresponding real coordinate of the starting point, wherein the result is taken as the real coordinate corresponding to the logical coordinate;

if the real coordinate is smaller than a corresponding lower limit of the buffer, the calculation system adding a corresponding side length of the buffer to the real coordinate;

if the real coordinate is larger than a corresponding upper limit of the buffer, the calculation system subtracting the corresponding side length of the buffer from the real coordinate; and the calculation system accessing the buffer with the real coordinates of the non-integer points.

2. The method for storing interpolated data of the plurality of non-integer points as claimed in claim 1, further comprising:

if the non-integer points exceed the boundary of the buffer, adjusting the logical coordinates of the starting point of the buffer, so as to make the non-integer points fall within the boundary of the buffer.

3. The method for storing interpolated data of the plurality of non-integer points as claimed in claim 1, wherein the memory storing the data of the integer points is an external memory of the calculation system.

4. The method for storing interpolated data of the plurality of non-integer points as claimed in claim 1, further comprising:

counting the size distribution of motion vector differences (MVDs) of at least one video bitstream; and determining the size of the buffer according to the size distribution.

5. The method for storing interpolated data of the plurality of non-integer points as claimed in claim 4, wherein the size of each of the MVDs is the maximum value among the coordinate components of the MVD.

6. The method for storing interpolated data of the plurality of non-integer points as claimed in claim 5, wherein the size of each of a predetermined proportion of the MVDs is smaller than the minimum side length of the buffer.

7. The method for storing interpolated data of the plurality of non-integer points as claimed in claim 1, wherein the data of the integer points are from a reference frame of a macroblock.

8. The method for storing interpolated data of the plurality of non-integer points as claimed in claim 7, wherein the logical coordinates of the non-integer points are calculated according to a motion vector of the macroblock.

* * * * *